United States Patent
McCurdy et al.

[15] 3,685,239
[45] Aug. 22, 1972

[54] HERMETICALLY SEALED DOUBLE-GLAZED WINDOW UNIT AND METHOD FOR SEALING SAME

[72] Inventors: Richard H. McCurdy; Lawrence W. Connelly, both of Fairfax, Va.

[73] Assignee: Sitelines, Inc., Fairfax, Va.

[22] Filed: Oct. 19, 1970

[21] Appl. No.: 81,857

Related U.S. Application Data

[63] Continuation-in-part of Ser. No. 838,093, July 1, 1969, abandoned.

[52] U.S. Cl. .....................52/172, 52/304, 52/616, 52/741, 156/109
[51] Int. Cl............E04c 2/38, E06b 3/24, E06b 7/12
[58] Field of Search........52/172, 616, 304, 308, 398, 52/400, 475, 656, 171, 741; 156/109

[56] References Cited

UNITED STATES PATENTS

| | | | |
|---|---|---|---|
| 2,062,747 | 12/1936 | Gelsflarp | 52/172 |
| 2,173,649 | 9/1939 | Firner | 52/616 |
| 2,898,643 | 8/1959 | Bush et al. | 52/400 |
| 3,030,673 | 4/1962 | London | 52/172 |
| 3,226,903 | 1/1966 | Lillethun | 52/172 X |
| 3,305,123 | 2/1967 | Nordby | 156/109 X |
| 3,553,913 | 1/1971 | Eisenberg | 52/172 |

*Primary Examiner*—Price C. Faw, Jr.
*Attorney*—Smyth, Roston & Pavitt

[57] ABSTRACT

Resilient glazing gaskets are utilized to mount spaced glass plates to inwardly directed glazing fins within a frame made up of joined elements. Continuous beads of sealant applied to the outside of the fins form an airtight seal between the gaskets and the inner surface of the frame. Beads of sealant applied between the fins to the inside of the frame where its elements are joined are connected with the continuous beads through holes provided in the fins adjacent the joints, thereby hermetically sealing the air space between the glass plates. The sealant is therefore continuous along the twelve edges of a three-dimensional rectangular box-like figure so as to completely seal the volume between the spaced glass plates. In an alternate embodiment, a gasket is used along the outer periphery of one of the glass plates. The second glass plate is mounted adjacent the fin on one side of the frame and sealant is positioned about its periphery to create the 12-sided sealing figure. Inlet and outlet ports at the top and bottom of the unit furnish means for conveniently charging and replenishing spaces provided between the fins with desiccant materials.

23 Claims, 10 Drawing Figures

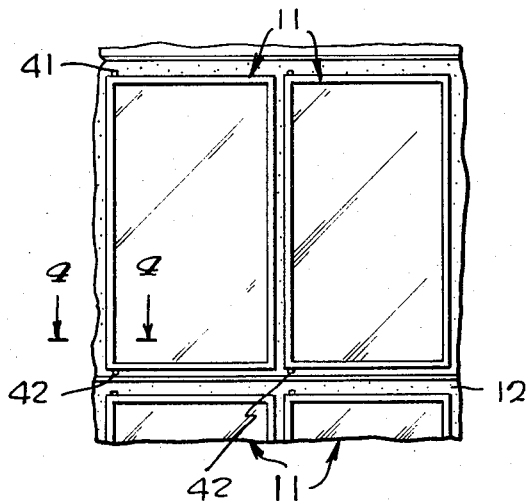
Fig. 1
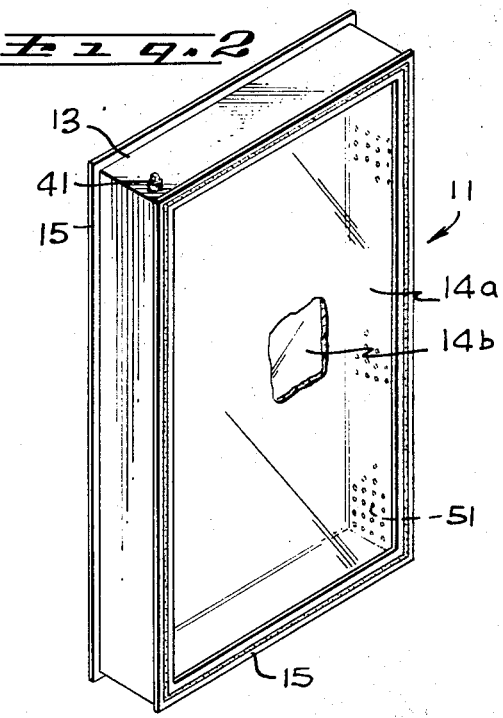
Fig. 2
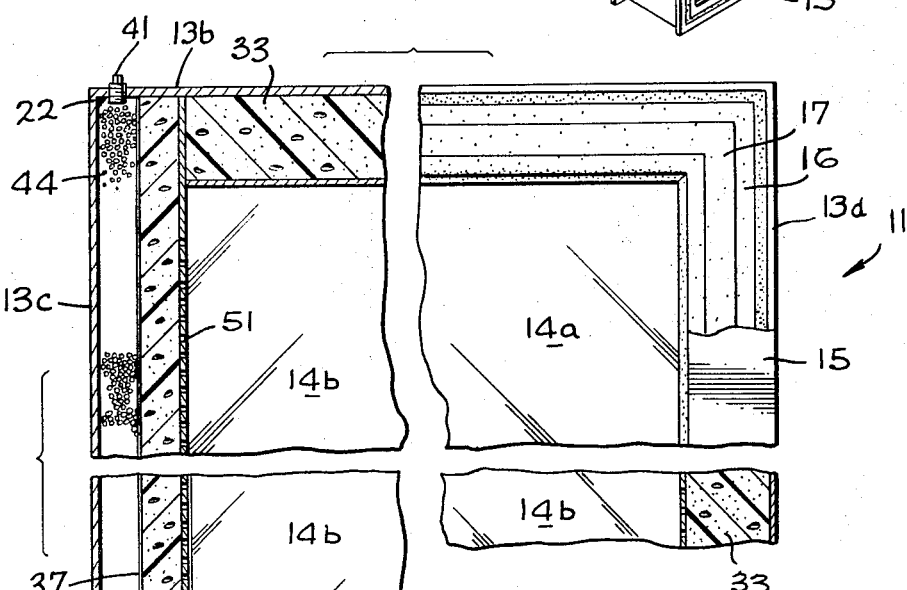
Fig. 3
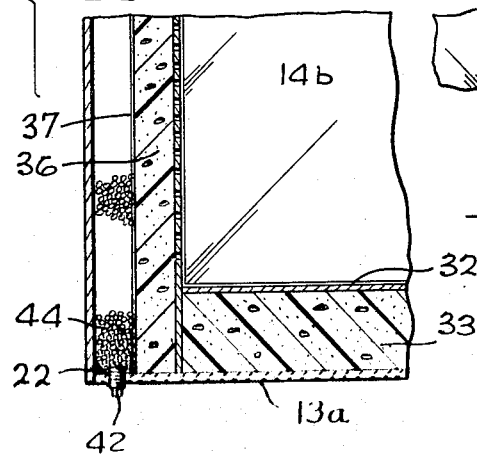
INVENTORS
RICHARD H. MCCURDY
LAWRENCE W. CONNELLY
BY
ATTORNEY

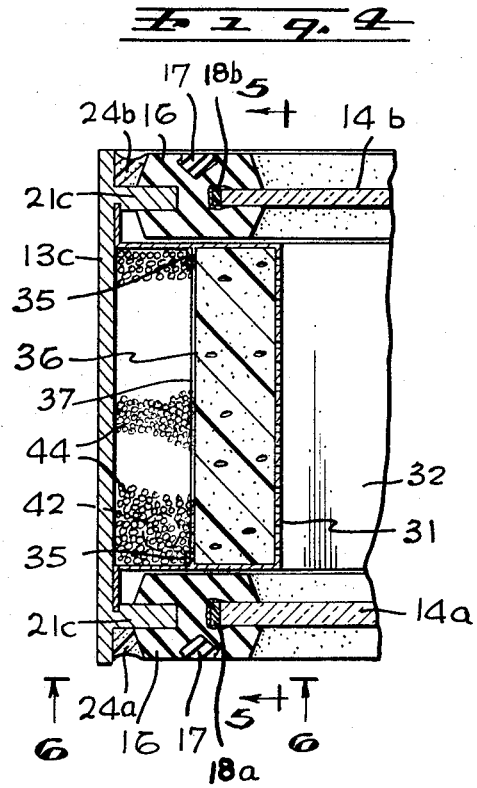
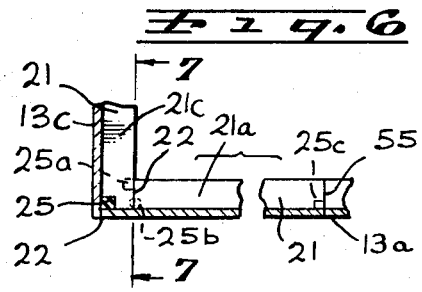
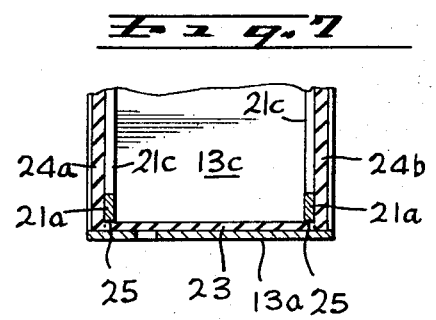
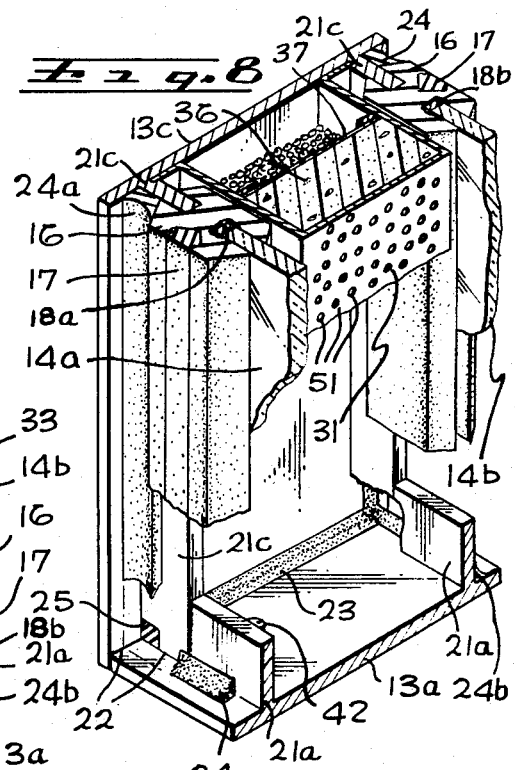
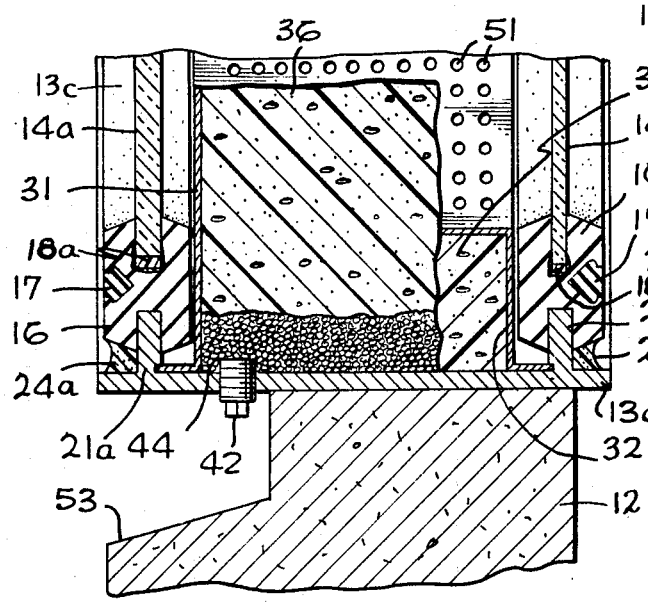
INVENTORS
RICHARD H. McCURDY
LAWRENCE W. CONNELLY
BY
ATTORNEY

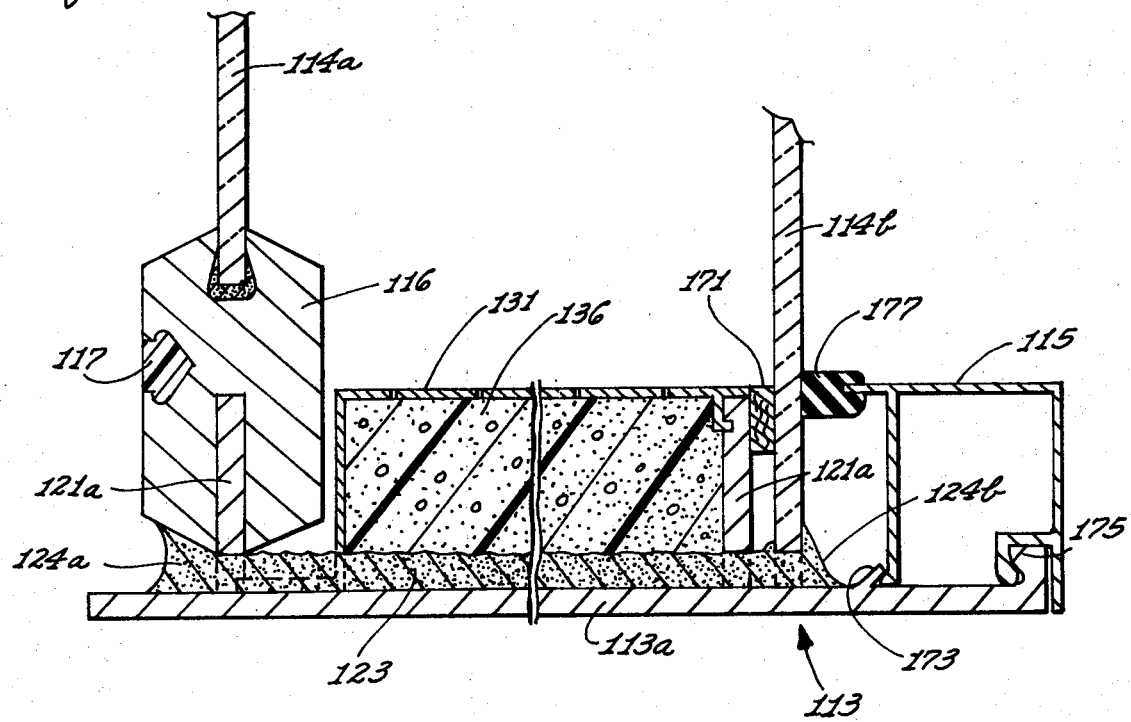

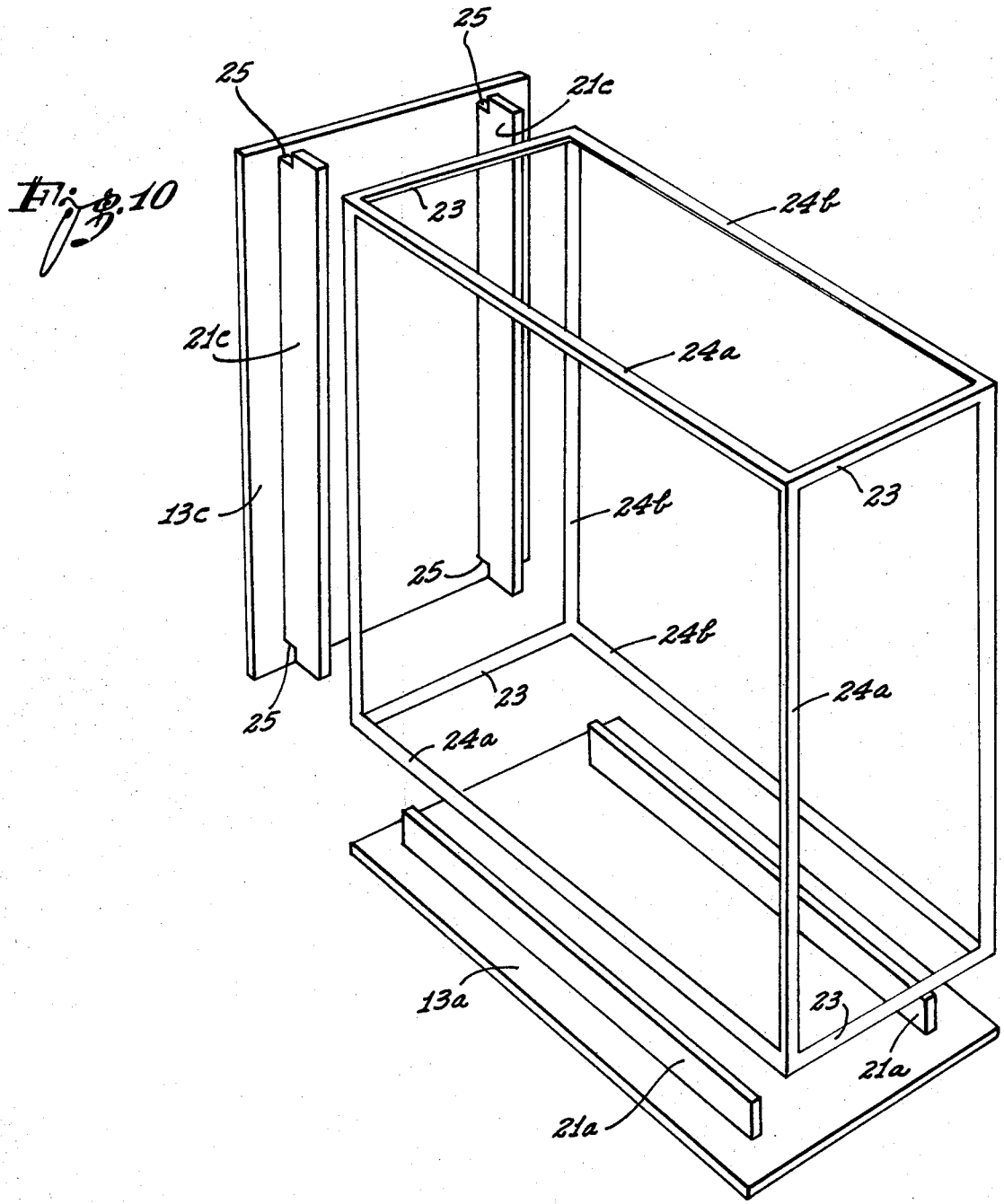

HERMETICALLY SEALED DOUBLE-GLAZED WINDOW UNIT AND METHOD FOR SEALING SAME

This is a continuation-in-part of copending application Ser. No. 838,093, filed July 1, 1969, and now abandoned.

BACKGROUND OF THE INVENTION

This invention relates to double-glazed window units, and more particularly to units of this type in which the space between the glass plates is hermetically sealed, and a method for sealing such units.

The technique of multiple glazing, that is, the mounting of two or more spaced sheets of glass in a framework enclosing the air space between the sheets is well-known in the art. Such units are commonly used today in the construction industry for both sound attenuation and thermal insulation. For maximum effectiveness in either of these uses, it is essential that the enclosure formed by the sheets of glass and the framework be airtight. This poses a number of problems in the design and construction of units of this type.

Commonly, the glass sheets are maintained in a spaced, substantially parallel relationship by metallic separators secured to the adjacent faces of the sheets by means of metallic coatings or adhesive materials. With these methods, great difficulty is encountered in maintaining the necessary airtight seal both at the interfaces of the materials and at the points where the separators are joined. To prevent leakage it is common practice to apply a thick coating of mastic or some other semiliquid sealant to the edges of the assembled units. In addition to producing an aesthetically unattractive unit, unless very carefully carried out this practice may leave undetected air leaks in the form of bubbles or discontinuities in thick protective layers. For both acoustical and thermal insulation purposes, the greater the air space, the greater the insulating value of the unit. Unfortunately, the wider the separator used to space the glass sheets, the greater these sealing problems become.

Once the unit has been sealed, it is highly sensitive to variations in ambient and internal air pressure. The changes in barometric pressure and changes in temperature outside and within the enclosed air space may cause air leakage through the sealant, separation of the glass sheets from the separators, and, in severe cases, even failure of the glass itself. Even small variations in the pressure differential will cause one or both of the sheets to bow inwardly or outwardly, resulting in an undesirable and sometimes frightening distortion of the view through the glass and the reflection from its surface. The greater the space between the glass sheets, and therefore the greater the volume of air entrapped between them, the more sensitive the unit is to such variations.

Finally, whether the unit is completely sealed or allowed to "breathe" to compensate for changes in air pressure, steps must be taken to avoid the condensation of moisture trapped or subsequently introduced into the air space on the inner faces of the glass sheets. The standard practice is to introduce a quantity of desiccant or dehydrating material into the air space at the time the unit is constructed. Once this material is fully saturated, however, it is no longer effective. In the past, if protection against condensation was of continuing importance, the unit would either have to be replaced entirely, or dismantled in order to recharge the dissipated absorbent.

SUMMARY OF THE INVENTION

In a preferred form, the present invention comprises a four-sided member joined at its corners to form a window frame which may be suitably installed in a building wall. When the frame is formed, a pair of continuous, inwardly directed, integral glazing fins are positioned near its inner and outer edges. A continuous resilient gasket is mounted on each of the fins and a sheet of plate glass is positioned within each gasket. The gaskets are of particular importance insofar as acoustical control is concerned since they prevent noise vibrations from being transmitted through the glass plates and frame from one side of the window to the other.

A continuous bead of sealant is applied between the gasket and the edges of the glass to prevent air and moisture leakage therebetween. A second continuous bead of sealant is applied between the gaskets and the outside of each glazing fin. These beads of sealant are normally sufficient to form an airtight seal for the volume between the sheets of glass.

When the frame members are joined, they are usually welded at their abutting ends. Even if welding is performed with extreme care and very expensive equipment and testing devices are used, hairline cracks can occur along the welds either during manufacturing or later on in the life of the window. Such cracks allow air and moisture to enter the otherwise airtight volume.

In order to eliminate this latter problem, small apertures are formed in each of the glazing fins at all of the frame corners and a sealant bead is applied over the weld in such a way that it joins both of the continuous sealant beads between the gaskets and the outside of the glazing fins. Therefore, even if a crack should occur in the frame corners near the fins, the glass enclosed volume will remain airtight.

Of course, one of the continuous beads of sealant around one of the glass plates may be installed on the inner side of the associated glazing fin. Consequently, no small apertures to allow passage of the transverse sealant bead will be needed in that fin. However, the result will be substantially the same as far as sealing the airtight volume is concerned, while allowing one of the sealant beads to be hidden from view from either the inside or the outside of the building, as may be desired.

In this manner, for a rectangular frame the sealant forms a 12-sided figure which prevents leakage between the gaskets and the frame and between the adjacent frame elements. Airtight sealing of the entire unit is thus assured. The resilience of the glazing gaskets permits the glass sheets to move inwardly and outwardly without substantial distortion under the influence of changes in internal and external pressure and vibrations.

The spaces between the fins at one or both sides of the unit may be adapted to receive and hold a substantial quantity of pelletized desiccant; inlet and outlet ports may be provided at the top and bottom of the frame for conveniently charging the unit with desiccant and removing the spent material, should it ever become saturated. A selective filter, such as a strip of pressboard or chipboard, may be positioned between the desiccant and the volume between the glass. The filter will allow moisture to migrate from the airtight volume to the desiccant but will prevent dust from traveling in the opposite direction when the desiccant chamber is recharged periodically with dry material.

In an alternate embodiment of the invention, a gasket may be positioned on only one of the glazing fins and a sheet of glass positioned close to the other fin. A continuous bead of sealant is applied between the edges of the sheet of glass and the outside of the adjacent fin and this bead is joined to the beads which extend along the frame corners through the apertures in the fins.

With this structure, an airtight window having slightly less sound deadening ability may be manufactured in a shorter time and at less expense.

It will be understood, of course, that if acoustical control is unimportant in a specific application, both sheets of glass could be so mounted without gaskets and a still less expensive but airtight window could be manufactured.

As will be apparent from a reading of the following description of two embodiments of the subject invention, as illustrated in the accompanying drawings, the principal objects of the invention are to provide an attractive, easily manufactured, and durable hermetically sealed multiple-glazed window unit which will automatically compensate, without leakage, separation, breakage, or substantial distortion for changes in external and internal pressure and which can be protected indefinitely against moisture condensation, and to provide a method for sealing such a unit permanently against air leakage.

BRIEF DESCRIPTION OF THE DRAWINGS

FIG. 1 is a fragmentary face view of a building illustrating a typical installation employing the window units of the subject invention;

FIG. 2 is a frontal perspective view of one of the double-glazed units shown in FIG. 1;

FIG. 3 is a fragmentary frontal view of a preferred embodiment of the window unit shown in FIG. 2 with portions cut away to illustrate more clearly the underlying structure;

FIG. 4 is a fragmentary sectional view taken along a line 4—4 in FIG. 1;

FIG. 5 is a fragmentary sectional view taken along a line 5—5 in FIG. 4;

FIG. 6 is a fragmentary detail view in reduced scale taken in the direction 6—6 of FIG. 4 to show the elements of a typical window frame, joined in a corner in accordance with the subject invention;

FIG. 7 is a fragmentary detail side view taken in the direction 7—7 of FIG. 6 to further illustrate the elements of a typical window frame, joined in accordance with the subject invention;

FIG. 8 is a fragmentary frontal perspective view of the lower left-hand corner of the window unit illustrated in FIGS. 2–7 with portions cut away to disclose the construction and sealing method of the subject invention;

FIG. 9 is a fragmentary sectional view of an alternate embodiment of a window formed in accordance with the present invention; and FIG. 10 is a perspective, schematic-type view of the sealant bead in a rectangular window formed in accordance with the present invention, whether of the preferred or alternate embodiment.

DETAILED DESCRIPTION OF THE INVENTION

More and more frequently the designers of large commercial and office buildings, apartment houses, and even single family residences are incorporating sound attenuating and thermal insulating multiple-glazed windows into their designs. FIG. 1 illustrates a typical arrangement of such windows, such as might be found in a high rise office building or apartment house. A plurality of such window units 11 are shown inserted as part of the structure of a wall 12 of the building. In some cases the window units 11 are separated only by muntins, forming what appears to be an entire wall of glass. In others, such as that shown, the window units are set in a preformed concrete or steel matrix forming wall 12.

FIG. 2 illustrates a typical window unit 11 embodying the subject invention. The unit 11 comprises a frame 13 constructed of extruded aluminum top, bottom and side sections or pieces 13a –13d welded at their corners in any desired configuration. The transparent portion of the window is made up of two or more lites, glass panels, or plates, shown here as 14a and 14b. For sound attenuating purposes, these panels are generally of different thicknesses, for example, front panel 14a being slightly heavier than rear panel 14b. An air space sealed between the two panels serves as a sound absorbing chamber, and care is taken to isolate each of the panels acoustically and thermally from its supporting structure in order to prevent the transmission of sound energy and heat from front panel 14a through frame 13 and into the building. The air space between panels 14a and 14b at the same time serves to prevent the transmission of heat in either direction through the window unit 11. Generally, tinted or reflectorized glass is utilized for the exterior panel to reduce the transmission of the infrared portion of the sun's spectrum, thereby enhancing the thermal insulating qualities of the window while reducing the glare of the sun's rays and providing appealing coloration both within and without the building. Optionally, attractive decorative trim 15 may be added around the periphery of frame 13.

FIGS. 3–8 illustrate in greater detail the preferred embodiment of a window unit 11 constructed in accordance with the subject invention. In FIG. 3, the decorative trim 15 has been partly removed to reveal frame 13 and one of the elastomeric structural glazing gaskets 16 which actually supports the glass panel 14a within frame 13. A gasket 16 (FIGS. 4 and 5) is also used to support the panel 14b. The resilient qualities of the gaskets 16 contribute substantially to the novel and highly effective sound attenuating and thermal insulating qualities of this invention. The glazing gaskets 16 may be made up in sections; however, preferably they are each molded in a single piece dimensioned to fit the particular frame 13 to be utilized. While the composition and form of gasket 16 may vary over a wide range, excellent results have been achieved utilizing extruded neoprene structural gaskets adapted to receive a wedge-type locking strip 17 of greater hardness.

The extrusions or sections 13a–13d forming the rectangular frame 13 are each provided with a pair of inwardly extending glazing fins 21a–21d, respectively. These fins may be either flush with, or, as shown, recessed inwardly from, one or both of the edges of their respective frame sections. When frame 13 is assembled, the joints 22 are welded, including, if desired, those between the several fins 21a–21d and between the fins and the frame sections (FIG. 8). Even with the most advanced welding techniques, however, it is extremely difficult to insure that these joints 22 are and will remain airtight. Accordingly, steps must be taken to avoid the possibility of leakage through the joints. As will be seen, the subject invention provides a method of doing precisely this.

Gasket 16 is provided with slots running its length, adapted to fit over fins 21a–21d and to receive the edges of panels 14a and 14b. When firmly seated on the fin, the gaskets have sufficient structural integrity to secure panels 14a and 14b within frame 13. They are sufficiently resilient, on the other hand, to permit panels 14a and 14b to undergo substantial transverse displacement under the influence of forces exerted normal to their surfaces by pressure differential variations, vibrations, and sonic energy without excessive bowing, bending, and distortion. Such forces, together with the energy generated by sonic caused vibrations in panels 14a and 14b themselves, are readily absorbed by gaskets 16 with little or no transmission to the structure of frame 13. Thus, the construction of the subject invention not only provides immediate and automatic compensation for pressure changes, but in addition serves admirably to attenuate sounds impinging on the external surface of panel 14a.

To protect against the aforementioned danger of air leakage through the welded joints of frame 13, a novel continuous interconnected sealant system is employed. Before panels 14a and 14b are mounted in place on fins 21a–21, a bead of sealant 23, preferably a polysulfide base mastic or paste which cures to a dry, resilient solid, is applied under pressure, for example by means of a pneumatic gun, to cover and seal each of the joints 22, whether welded or not, at the interfaces of the sections of frame 13.

Panels 14a and 14b are then mounted in place by means of gaskets 16. When properly fitted, gaskets 16 form an airtight seal around panels 14a and 14b; however, to insure against air or moisture leakage, a bead of sealant 18a and 18b may be introduced between each of the gaskets 16 and the edges of the respective panels 14a and 14b. Continuous beads 24a and 24b of the same sealant are applied under pressure around the periphery of gaskets 16 between the outer edges of the gaskets 16 and the outer ends of the fins 21a–21d at the inner surfaces of frame sections 13a–13d. Previously the gaskets 16 and the metal surfaces of fins 21 and the inner surfaces of frame 13 may have been "primed" by washing them thoroughly with conventional solvents to remove surface dirt, oil, and foreign materials which would prevent the sealant from adhering to them.

In the case of a frame 13 having the outer sides of fins 21a–21d flush with its outer edges, the beads of sealant 24a and 24b would be extended from the lower end of the gaskets to cover both the sides and the outer edge corners of the frame sections as well.

Ports or passageways 25 are cut or drilled through fins 21c and 21d adjacent each of the joints 22 in the sections of frame 13. These passageways 25 extend through the fins and are positioned so as to allow sealant at each of the junctions of beads 23 with beads 24a and 24b to cover the joint 22 in the areas under the fins and between beads 24a and 24b. Care is taken in the application of beads 23, 24a, and 24b to force the sealant through passageways 25 to cover the joints 22 within the air space between beads 24a and 24b. As shown in FIGS. 8 and 10, the sealant fills each of the passageways 25 and creates what amounts to a single, continuous, 12-sided interconnected system of tightly adhering sealant covering all of the possible avenues of entry or escape of air through the exposed joints 22 in frame 13. A significant and novel feature of this system is that the sealant filling passageways 25 prevents leakage through the portion of the joints 22 lying under the various fins 21. Gaskets 16 cover and prevent the entry or escape of air through the underlying portions of those joints 22 between the fins 21a–21d. Beads 24a and 24b adhere to the edges of gaskets 16 and effectively form a continuous seal with them. The combination of beads 23, 24a, and 24b, gaskets 16, beads 18a and 18b, and the sealant filling passageways 25 assures the absolute airtight integrity of the air space between panels 14a and 14b.

It will now be realized by those skilled in the art that, if desired, one of the continuous beads of sealant 24a or 24b may be installed between the outer edge of the gasket and the associated fin on the inside of the airspace to be sealed, thus eliminating the need for the ports or passageway 25 in that fin. This might be done, for example, when it is desired to prevent one of the beads from being seen from the outside of the sealed volume in a circumstance in which no trim will be added to the window frame.

It is obvious that ports 25 need not be located precisely at the intersections of the sides, top, and bottom of frame 13, but may be positioned at any convenient location in the vicinity of the joints 22 between these members. Two such alternative positions are illustrated in FIG. 6 at 25a and 25b. With the ports located in these latter positions, the only modification needed in the practice of the subject invention as just described would entail the extension of internal beads 23 along fins 21 until they were adjacent ports 25a and 25b, so that the beads 23 forced through ports 25a and 25b would be assured of making contact with beads 24a and 24b.

In the assembly process, before the latter of panels 14a and 14b is mounted in place and decoratively finished, a perforated pan 31 is positioned at either or both sides of frame 13 between fins 21c (FIG. 4) and/or 21d. Decorative trim plates 32, which may be perforated for sound attenuating purposes if desired, are secured between fins 21a and 21b at the bottom and top of frame 13. Conventional acoustical filling material 33 (FIG. 5) such as polyurethane foam or the like may be inserted into the spaces between plates 32 and the upper and lower sections of the frame. A panel 36 of sound absorbing polyurethane foam (FIG. 4) or similar material, preferably permeable to airborne moisture, is positioned behind the perforated pan or pans 31, and held in place by conventional means such as cement, flanges 35 formed on the inner side walls of pan 31, or the inner surface of the frame itself.

A selective filter 37, which may be positioned on either side of the flanges 35, acts to prevent dust from the desiccant from reaching the volume between the glass plates while allowing moisture in the volume to migrate to the desiccant. Although any suitable material may be used for the filter, it would appear to be expedient to use a paper material such as pressboard or chipboard. When the desiccant is changed, as described below, dust cannot reach the space between the glass plates but moisture brought in by the air during the change and moisture which naturally migrates through the gasket, metal frame, etc., will always be able to be absorbed by the desiccant.

Ports are provided in the lower and upper frame sections 13a and 13b below and above the space between the filter 37 and the adjacent side 13c of the frame and are adapted to be hermetically sealed with airtight filler discharge plugs 41 and 42, respectively. Plugs 41 and 42 are positioned so that the space between filter 37 and the inner wall of frame section 13c may be charged through the former with the desiccant 44, preferably in the form of solid beads, after the entire unit 11 has been assembled and tested for air leakage. Once the unit 11 has been charged with desiccant 44 and filler plug 41 screwed into place, any moisture trapped within the air space between panels 14a and 14b will migrate through the perforations 51 in pan 31, retainer 36, and filter 37 to be absorbed and retained by desiccant 44. When desiccant 44 becomes saturated, such as by panels 14a and 14b or frame 13 suffering substantial structural damage, or by natural migration over a long period of time, the saturated desiccant 44 may readily be removed through discharge plug 42 and replaced through filler plug 41 after the damage has been repaired.

To provide ready access to plugs 41 and 42, it has been found both convenient and aesthetically appealing in some cases to provide recesses 53 in the wall 12 above and below the units 11. With such an arrangement, the removal and recharging of desiccant 44 may be accomplished with ease without disturbing the occupants of the building or the unit 11 itself.

It is obvious from the foregoing description that certain modifications from the specific embodiments illustrated are well within the scope of the subject invention. By way of example, the method of the subject invention may be practiced whether the elements of frame 13 are joined at the corners 22 or at some intermediate point such as that designated by numeral 55 in FIG. 6. In such latter case, an internal bead of sealant 23 would be laid down along the inner surface of frame 13 over the joint 55 and a port 25c would be provided through fin 21 adjacent that joint. Equally clearly, the subject method is applicable for hermetically sealing an enclosed air space in a structure other than a multiple-glazed window; for example, an enclosed tank or similar receptacle wherein airtight security is essential. Likewise, the location of the plugs 41 and 42 may be varied for convenient access, and, if necessary, the structure shown in FIGS. 4–8 repeated in the opposite side of frame 13 to provide space for additional desiccant 44.

When it is unnecessary to provide the maximum noise reduction capability in the structure of a window, the inner sheet of glass, or both panels in some cases, may be mounted as shown in FIG. 9, wherein an alternate embodiment of the principles of this invention have been illustrated. In that figure, all elements which are identical or clearly comparable to those of the preferred embodiment have been similarly labeled, preceded by the numeral "1," such that panel 14a is labeled as 114a, etc. Further description of that structure is therefore unnecessary and only the distinctions need be described now.

As shown in that figure, the panel 114a is mounted as in the preferred embodiment. On the other hand, panel 114b is not held in place by a gasket but is positioned adjacent the fin 126a, being separated therefrom by a cushion 171 which prevents rattling of the panel against the frame.

A continuous bead of sealant 124b extends between the periphery of the panel and the inner faces of the frame sections adjacent the outer ends or roots of the fins. Bead 124b is connected to the four beads 123 so that the sealant forms the same shape as does the sealant of the preferred embodiment, shown in FIG. 10.

The perforated pan 131, which is somewhat resilient, may be snapped into place on the fins 121a in the manner shown in FIG. 9 to hold the foam 136 in place. On the side of the window having the desiccant compartment, suitable flanges may be formed on the pan and fin to hold the foam and filter in place.

A trim frame 115 may be snapped onto the frame 113 by means of the interlock flanges 173 and 175 so as to enhance the aesthetic quality of the window and protect the bead 124b. A second cushion 177 may be mounted on the trim to hold the glass firmly against cushion 171 and also to prevent rattling of the glass against the trim.

With this structure, less sound attenuation is achieved but less cost is involved. In many instances, such lower cost windows, or windows in which both panels are mounted without gaskets, would be quite satisfactory in quiet residential areas.

Those skilled in the art will now realize that the present invention can be used to produce a vastly improved airtight window of any size or shape. The fin apertures at the frame junctions allow the manufacturer to form a continuous three dimensional sealant bead, such as that shown in FIG. 10, which totally obviates the hairline weld crack problems described previously. They will now also realize that many other embodiments, modifications, alterations, etc., of this invention can be produced without exceeding the scope of the invention as defined by the following claims. For example, both panels could be mounted in a single gasket on one fin, or could be mounted without gaskets against a single fin.

Therefore, what is claimed is:

1. A hermetically sealed multiple-glazed window unit comprising:

a frame made up of joined elements having spaced, inwardly directed glazing fins formed on the inner faces thereof;

resilient structural glazing gaskets mounted on said fins and adapted to receive, and to maintain airtight contact with, the edges of glass panels, said glass panels and frame enclosing an air space;

first beads of sealant on the faces of said fins outside of said air space, said beads adhering to said gaskets and extending outwardly from the periphery of said gaskets to cover and hermetically seal each of the joints in said fins;

passageways through said fins, located adjacent each of the joints between the elements of said frame, and in internal communication throughout their length with said joints;

second beads of sealant covering and sealing the portion of each of the joints in said elements and fins exposed within said air space; and sealant filling said passageways and cohesively bonded to said first and second beads of sealant therethrough.

2. A window unit as defined by claim 1 in which said first beads of sealant comprise a single continuous bead around the perimeter of each of said gaskets.

3. A window unit as defined by claim 1 in which said passageways pass through the bases of said fins and the ends thereof exposed to said air space are positioned adjacent the inner faces of said elements.

4. A window unit as defined by claim 1 including a desiccant contained within said air space.

5. A window unit as defined by claim 4 including:
 a perforated pan extending between the adjacent fins of at least one of said elements;
 a retainer of sound attenuating material, positioned between said pan and the inner face of said elements, spaced from said face to define a receptacle for said desiccant; and
 sealable openings in said frame communicating with said receptacle for charging said receptacle with fresh desiccant and removing saturated desiccant therefrom.

6. The window unit of claim 5 including:
 a selective filter positioned between said retainer and said receptacle to allow moisture to travel from the remainder of said air space to said receptacle but prevent dush from traveling from said receptacle to the remainder of said air space.

7. A window unit as defined by claim 5, and having a top and a bottom, in which said receptacle extends substantially vertically from the said top to the said bottom thereof, and said means comprise:
 openings through the top and bottom of said frame, located above and below said receptacle, and communicating with the upper and lower ends thereof, respectively; and
 removable closures adapted to seal said openings.

8. In a structure having an airtight sealed volume therein,
 a frame of predetermined size and shape having at least one substantially lateral junction therein,
 fin means on said frame, having a substantially lateral aperture extending therethrough,
 a plurality of plate members,
 means for positioning said plate members relative to said fin means,
 continuous sealant beads extending parallel to said fin means along the base thereof intermediate the periphery of each of said plates and said frame, and
 at least one substantially lateral sealant bead cohesively bonded to said continuous sealant beads and passing through and filling said substantially lateral aperture.

9. The structure of claim 8 wherein
said substantially lateral aperture is formed in such a position relative to said substantially lateral junction that the portion of the junction between said continuous sealant beads is covered by said substantially lateral sealant bead.

10. The structure of claim 8 wherein
at least one of said plate member positioning means comprises
 gasket means mounted on said fin means and
 means in said gasket means for receiving the edges of at least one of said plate members.

11. The structure of claim 10 wherein
said plate member positioning means also comprises
 sealant means intermediate the edge of said at least one plate member and said gasket receiving means.

12. The structure of claim 8 wherein
at least one of said plate member positioning means comprises
 means intermediate at least one of said plate means and said fin means for cushioning said plate relative to said fin means to prevent rattling therebetween.

13. The structure of claim 12 including
trim means positioned on said frame means and having
 means for holding said at least one plate member against said cushioning means.

14. The structure of claim 8 wherein
said fin means comprises
 a plurality of spaced fin means equal in number to the number of said plate members, each having
 a substantially lateral aperture therein such that said at least one substantially lateral sealant bead passes through such an aperture in every fin means.

15. An airtight structure comprising
a frame member having
 at least one substantially lateral junction therein and
 a plurality of continuous fin means extending substantially perpendicularly from said frame member,
a plurality of plate members,
means for positioning said plurality of plate members relative to said fin means in airtight relation thereto,
first continuous sealant beads formed at the intersections of said fin means and said frame member to prevent passage of air between said plate members and said fin means,
 at least one of said first continuous sealant beads being located on the exterior of the airtight structure and its associated continuous fin,
a second continuous sealant bead cohesively bonded to said first continuous sealant beads and sealing said at least one substantially lateral frame junction intermediate said first beads, and
means in the said continuous fin adjacent said at least one first continuous sealant bead for ensuring bonding contact between said at least one first and said second beads.

16. The structure of claim 15 including
means intermediate said plate members for removing moisture from the air therebetween.

17. The structure of claim 16 including means for replacing said moisture removing means when it becomes saturated.

18. Means for forming an airtight volume between a pair of plates which are mounted on inwardly directed, continuous fins extending from a sectioned frame comprising a pair of continuous, substantially parallel sealant beads intermediate the pair of plates and the fins to prevent the passage of air therebetween, at least one of said beads being located on the exterior of the airtight volume and its associated continuous fin, and a transverse sealant bead cohesively bonded to said pair of continuous beads and covering that portion of each junction of adjacent frame sections between said pair of continuous beads.

19. The structure of claim 18 wherein said pair of continuous beads are positioned outside of the fins relative to the airtight volume, and including aperture means in the fin means at each junction of adjacent frame sections, which aperture means are filled by the transverse sealant bead covering that junction.

20. In a frame made up of joined elements having spaced, inwardly directed fins formed on the inner faces thereof, and having gaskets mounted on said fins surrounding and supporting spaced panels, said frame and panels enclosing an air space, a method for hermetically sealing the joints between said elements comprising:

applying first beads of sealant to the faces of said fins outside of said air space, said beads adhering to said gaskets and extending outwardly from the periphery of said gaskets to cover and hermetically seal each of the joints in said fins;

providing passageways through said fins adjacent each of the joints between said elements and in communication throughout their length with said joints;

applying second beads of sealant to seal the portion of each of the joints in said elements and fins exposed within said air space; and filling each of said passageways with sealant, thereby joining said first and second beads.

21. The method defined by claim 20 wherein said step of applying said first beads of sealant includes forming continuous beads of sealant surrounding the perimeters of said gaskets.

22. The method defined by claim 20 wherein said step of providing passageways through said fins includes positioning the passageways at the bases of said fins adjacent the junctions of the joined elements.

23. The method of sealing a volume between a pair of plates which are mounted on a pair of find extending inwardly from a sectioned frame comprising the steps of applying a first bead of sealant across at least a portion of each junction of the sectioned frame and applying continuous beads of sealant between each of the plates and to associated fin so that each of the continuous beads of sealant is cohesively bonded to each first bead of sealant, at least one of said continuous beads of sealant positioned outside of its associated fin relative to the sealed volume.

* * * * *